United States Patent [19]

Dodge

[11] 4,328,567
[45] May 4, 1982

[54] METHODS AND APPARATUS FOR ACOUSTIC LOGGING IN EARTH FORMATIONS

[75] Inventor: Carl Dodge, Alief, Tex.
[73] Assignee: Halliburton Company, Duncan, Okla.
[21] Appl. No.: 94,415
[22] Filed: Nov. 15, 1979
[51] Int. Cl.$^3$ ............................ G01V 1/40; G01V 1/30
[52] U.S. Cl. .................................... 367/32; 367/75; 367/49; 364/422
[58] Field of Search .............. 367/25, 32, 41, 75, 367/49; 181/102; 364/422; 166/249, 250

[56] References Cited

U.S. PATENT DOCUMENTS

| | | | |
|---|---|---|---|
| 2,231,243 | 2/1941 | Beers | 367/32 |
| 3,073,406 | 1/1963 | Westphal | 367/32 |
| 3,292,143 | 12/1966 | Russell | 367/49 |
| 3,311,875 | 3/1967 | Geyer et al. | 367/41 |
| 3,330,375 | 7/1967 | White | 367/75 |
| 3,781,784 | 12/1973 | Desbrandes | 367/49 |
| 4,217,659 | 8/1980 | Glenn | 367/32 |

FOREIGN PATENT DOCUMENTS

| | | | |
|---|---|---|---|
| 2321709 | 4/1977 | France | 367/75 |
| 544925 | 2/1975 | U.S.S.R. | 367/32 |
| 197706 | 4/1977 | U.S.S.R. | 367/32 |

OTHER PUBLICATIONS

White, "Computed Seismic Speeds . . . Saturation", 4/75, Geophysics, vol. 40, #2.
Pichett, "Acoustic Character Logs and their Applications in Formation Evaluation", 10/10/62, pp. 659–667, 37th Annual Fall Meeting of SPB, L.A., Calif.

*Primary Examiner*—Nelson Moskowitz
*Attorney, Agent, or Firm*—William J. Beard; John H. Tregoning

[57] ABSTRACT

An acoustic well logging system is provided for measuring the speed of propagation of all acoustic wave propagation modes of earth formations penetrated by a borehole simultaneously. A linearly changing frequency swept acoustic signal is generated and received at a spaced distance apart in a borehole. The received signal is mixed in a product forming device with the transmitted signal. Mixer product signals are low pass filtered to remove high frequency components and the resultant signals spectrum analyzed. Frequency spectra components may then be interpreted directly in terms of speed of propagation of various acoustic energy wave propagation modes.

12 Claims, 3 Drawing Figures

METHODS AND APPARATUS FOR ACOUSTIC LOGGING IN EARTH FORMATIONS

BACKGROUND OF THE INVENTION

This invention relates to methods for measuring acoustic wave travel times in earth formations in the vicinity of a well borehole. More particularly, the present invention relates to techniques for measuring multiple acoustic wave component or wave propagation modes travel times in earth formations in the vicinity of a well borehole using swept frequency transmitting techniques.

Acoustic or sonic well logging has become an important method for determining the physical characteristics of earth formations in the vicinity of a well borehole. Measurements of the acoustic compressional wave velocity, or travel time, between a transmitter and receiver in a well borehole can define physical characteristics of the earth formations which are indicative of the capability of these formations to produce oil or gas. For example, a measurement of the compressional wave travel time gives a direct indication of the porosity of the formation in the vicinity of the well borehole. Such velocity or travel time measurements have therefore become practically standard for all new wells which are drilled.

In the prior art, acoustic or sonic well logging techniques have been used to measure the travel time or velocity of acoustic waves in the formations in the vicinity of the borehole. These methods typically use pulsed acoustic transmitters. An acoustic transmitter is fired impulsively, or pulsed, and the length of time necessary for the acoustic wave pulse generated by the transmitter to propagate from the transmitter through the earth formation to a receiver located a spaced distance away from the transmitter is measured. By appropriately combining the measurements of acoustic wave travel time at several receivers spaced different distances from either a single or multiple acoustic transmitters, then the acoustic wave travel time or sonic velocity of propagation of the formation may be determined. Quite elaborate schemes and geometrical considerations for eliminating the effect on the travel time measurement of the borehole and borehole fluids have also been developed.

In more recent years, it has become desired to measure other acoustic wave mode travel times than merely the compressional wave velocity. For example, in U.S. Pat. No. 4,131,875 issued Dec. 26, 1978 techniques are described for measuring so called "late arrival" waves or Stonely waves. Similarly, other prior art techniques such as that described in U.S. Pat. No. 3,354,983 issued Nov. 28, 1967, describes techniques for measuring acoustic shear wave velocities. In all of these techniques, an acoustic pulse is generated by the transmitter and the wave form of the acoustic signal at one or more receivers is analyzed, in order to determine the velocity of either compressional, shear or Stonely waves in the vicinity of the borehole.

Pulsed acoustic techniques depend upon the amplitude detection of the arrival of acoustic waves at a receiver. Such techniques are prone to errors generated by random noise occurring as a well logging instrument is moved through the borehole. Acoustic noise may be generated by the instrument body, or centralizers on the instrument body, scraping along the sides of the borehole as the tool is moved therethrough. Similarly, techniques involving pulsed acoustic transmitters for measuring shear waves or Stonely waves depends upon an elaborate interpretation of the waveform of the arriving wave at the receiver. Such interpretations are generally based on theoretical calculations done with simplified mathematical models of the earth formations in the vicinity of the borehole. If the simplified mathematical model proves to be in error, then the interpretation of the arriving waveform at the receiver may be in error, in its relationship to more complicated real life geometries and conditions than taken into account in the model.

It would be highly desirable to provide a method for measuring the travel time of various components of acoustic energy (compressional or primary wave, shear wave, Rayleigh wave, direct (fluid) wave, extentional wave, and Stonely wave) in earth formations in the vicinity of a well borehole which was not dependent upon a theoretical interpretation of an arriving acoustic pulse waveform. The system of the present invention provides a direct measurement of the travel time of all components of acoustic energy from a transmitter to a receiver in earth formations in the vicinity of a well borehole.

BRIEF DESCRIPTION OF THE INVENTION

In the present invention, a downhole well logging tool is provided with an acoustic transmitter and at least one acoustic receiver that is spaced a longitudinal distance from the transmitter. Multiple transmitters and receivers could be used, if desired. The output of the acoustic transmitter of the present invention is repetitively swept at a linear rate over a predetermined frequency range. The frequency swept output of the transmitter is propagated in all the various modes of propagation of acoustic energy through the earth formations in the vicinity of the well borehole and is detected at the spaced receiver. In one embodiment both transmitter and receiver may be mounted on movable arms or pads which can be pressed against the wall of the borehole. Contact between the transducers and the borehole wall in such an embodiment is desirable so that the power required to propagate energy from transmitter to receiver can be reduced and errors in transit time due to additional transit times from transducer to the borehole wall can be eliminated.

The output signal from the receiver is fed to one input of any device capable of forming an output proportional to the product of two input signals, such as a double balanced mixer. The swept frequency signal being applied to the transmitter is supplied to the remaining input of the product forming device or mixer. The mixer output thus represents the sum and difference frequencies between the instantaneous transmitter frequency and the frequency of the signal being received at the acoustic receiver. The sum frequencies are removed by filtering. The difference frequencies are a function of the travel time or velocity of the various modes of acoustic energy propagated from the transmitter through the borehole and the earth formations in the vicinity of the borehole and received at the receiver. If more than one component of acoustic energy is propagated such as the Stonely and/or shear wave modes and/or Rayleigh mode, and or the direct wave mode, and/or the extentional wave mode together with the compressional wave mode, then difference frequencies representative of the travel time of each mode will appear in the output from the mixer. The only distinguishing characteristic of the different modes as far as this invention is concerned is that each mode to be identified has a travel time from transmitter to receiver different from any other mode.

The mixer difference frequency output is telemetered to the surface where the power versus frequency (ie., power spectrum) thereof is determined. This power spectrum provides a frequency component from each different component of acoustic energy propagated through the earth formations in the vicinity of the borehole. These components are then respectively interpreted in terms of the travel time or acoustic velocity of propagation for each of the modes. These travel times or velocities for the different acoustic modes are then recorded as a function of depth in the well borehole.

The oscillator is periodically swept over the chosen frequency range. The difference frequencies may be spectrum analyzed after each sweep or may be spectrum analyzed based on difference frequencies averaged over several sweeps of frequency of the transmitter as desired. This process will enhance the signal to noise ratio of the system.

The present invention may be best understood by taking the following detailed description thereof in conjunction with the appended drawings in which:

DESCRIPTION OF THE PREFERRED EMBODIMENT

Figure 1:
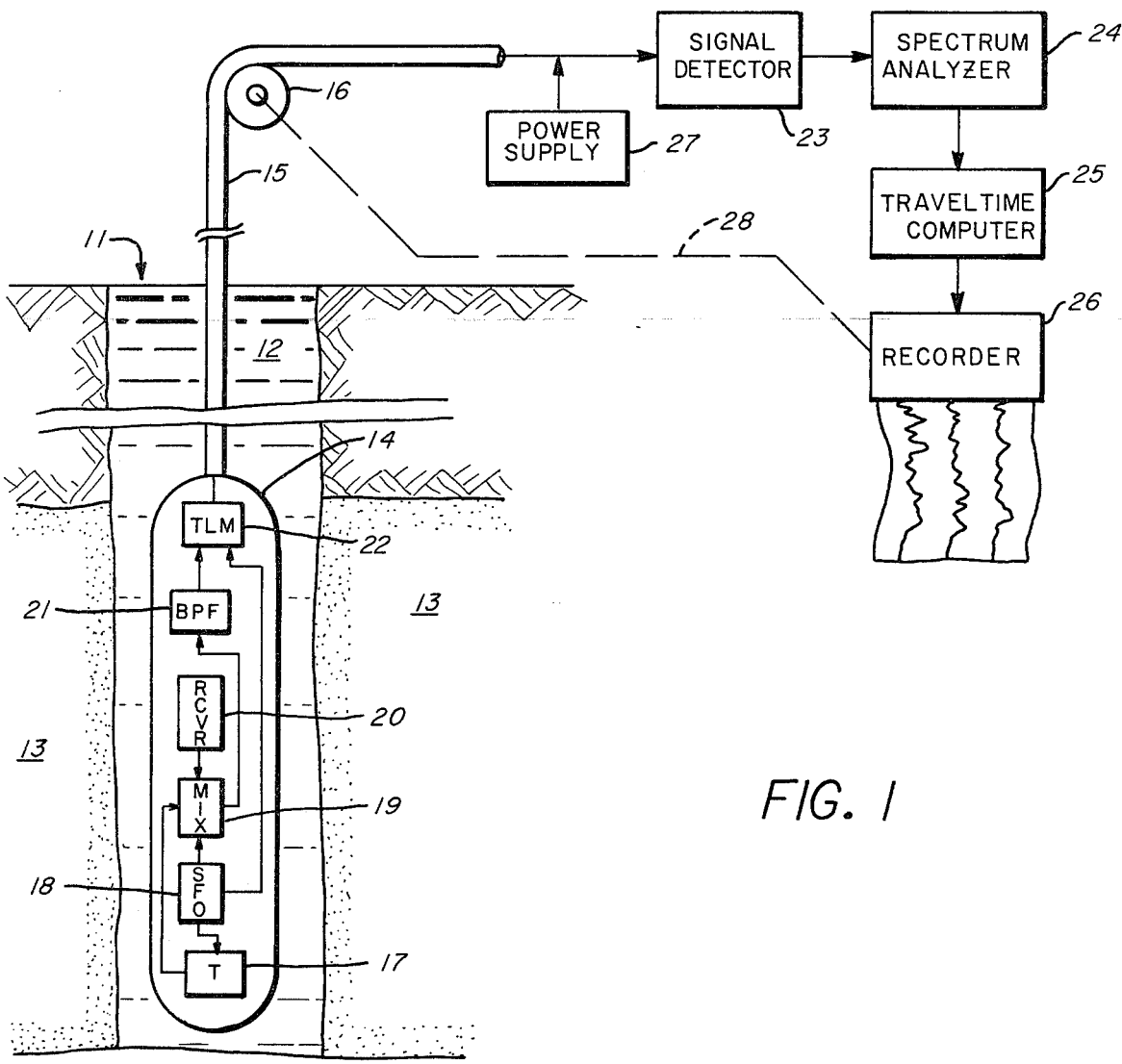
FIG. 1 is a schematic diagram illustrating a well logging system in accordance with the concepts of the present invention.

When an acoustic transducer is energized in a borehole, energy may propagate in many modes which include compressional or primary waves, Rayleigh or pseudo Rayleigh waves, direct or fluid waves, extensional or tube waves, shear waves, and Stonely waves. To the extent that such waves travel with differing velocities, it is possible to measure the velocity of each wave in the earth formations in the vicinity of the borehole by using a linearly swept frequency oscillator and a coherent detection technique. The present invention utilizes a relatively low power linearly swept frequency oscillator coupled to a transmitting transducer. A receiving transducer spaced longitudinally in the borehole from the transmitting transducer is used to receive the acoustic energy which has traversed the earth formation and/or the material in the borehole between transmitter and receiver. The transmitting and receiving transducers are not necessarily of constant impedance over the swept frequency range. This technique can function without degradation in the presence of strong acoustic noise or incoherent noise sources such as might be generated by the motion of the logging tool through the borehole fluid in logging the well. Noise sources here are incoherent so long as acoustic energy generated by that source does not change frequency at the same rate as the swept frequency of the linear oscillator. Since such incoherent noise will not interfere with the detection technique, both the transmitting and receiving transducers may be (but do not have to be) urged against the wall of the borehole. A system using transducers mounted in this manner does not suffer from transit time errors of waves traveling through the fluid between the borehole wall and the sonde.

An oscillator of initial frequency $f_1$ is connected to a transmitting acoustic or ultrasonic transducer. During the time interval $t_1$ to $t_2$ (where $t_2$ is greater than $t_1$), the frequency of the oscillator is swept at a linear rate such that at $t_2$ the oscillator is at a frequency $f_2$. In this linear condition Equation 1 holds $$(f_2 - f_1)/(t_2 - t_1) = K \tag{1}$$

At anytime t ($t_1 \leq t \leq t_2$) the instantaneous frequency f of the oscillator is given by Equation 2. The final frequency $f_2$ may be greater than or less than $f_1$ so that K may be positive or negative.

$$f(t) = f_1 + K(t - t_1) \tag{2}$$

A generalized sinusoidal signal $\cos \theta(t)$ has an instantaneous phase $\theta(t)$ and an instantaneous frequency f(t) which are related by Equation 3.

$$f(t) = \frac{1}{2\pi} \frac{d\theta(t)}{dt} \tag{3}$$

$$\text{where } \theta(t) = 2\pi \int_0^t f(t)dt \tag{4}$$

for $f(t) = f_1 + K(t - t_1)$
then $$\theta(t) = 2\pi[f_1 + K(t/2 - t_1)]t \tag{5}$$

The oscillator output O(t) at any time t during the interval ($t_1 \leq t \leq t_2$) is given by Equation 6.

$$O(t) = O_o \cos 2\pi(f_1 + K(t/2 - t_1))[t - t_1] \tag{6}$$

The output from an approximately linearly responsive receiving transducer longitudinally spaced a distance L from the transmitting transducer is supplied to one input of a double balanced mixer. The oscillator which is driving the transmitting transducer is fed to the second input of the mixer. The oscillator is periodically caused to linearly charge frequency from $f_1$ to $f_2$ and then shut off. If there are N modes of propagation of acoustic energy, where each mode is characterized only by the velocity of propagation, then an acoustic wave $1 \leq i \leq N$ propagates at a rate $V_i$ and takes a time interval $L/V_i$ to arrive at the receiver.

The phase of the received signal due to wave i, that has propagated from the transmitter to the receiver, lags behind the phase of the transmitter by an amount proportional to the time the wave takes to propagate from the transmitter to the receiver. The total received wave $R_T$ is a superposition of all N waves propagating between the transmitter and the receiver. If mode i has an amplitude $R_i$, equation 7 describes this condition.

$$R_T = \tag{7}$$

$$\sum_{i=1}^{N} R_i \cos 2\pi \left[ f_1 + K \left( \frac{t - \frac{L}{V_i}}{2} - t_1 \right) \right] \left( t - t_1 - \frac{L}{V_i} \right)$$

The crux of the technique is to accurately measure the time that each wave propagation mode takes to propagate from transmitter to receiver by measuring the difference between the instantaneous transmitter frequency, which is being swept at a linear rate, and the instantaneous frequency at the receiver due to each received wave mode. The difference frequency is formed by multiplying the transmitted signal by the received signal in a balanced mixer to form the sum and difference frequencies. The mixer output is then low pass filtered in a low pass band filter to eliminate the sum frequencies so that only the difference frequencies remain.

As time continues, the difference in the transmitter (or oscillator) frequency and the frequency of the received signal remains constant in a dispersionless medium. It will be recalled that a dispersionless medium is one in which the velocity of propagation of the particular wave mode concerned is constant over the frequency range of interest. If the medium exhibits dispersion, the difference frequency for a given propagation mode will vary inversely with the propagation velocity.

The operation performed by the mixer is a multiplication operation. Thus, the output of the mixer M is given by Equation 8, $$M = R_T O \qquad (8)$$

where $R_T$ and $O$ are as previously defined. The multiplication indicated in (8) results in an oscillation whose phase is the sum of the oscillation phases indicated in equations (6) and (7) and the difference of the phases shown in the same equations.

M is low pass filtered to allow only difference frequencies and to reject sum frequencies. The low pass filtered mixer output M (t) is given by Equation 9.

$$M(t) = \sum_{i=1}^{N} O_o \cdot \qquad (9)$$

$$R_i \cos 2\pi \left[ K \frac{L}{V_i} (t - t_1) - \frac{K}{2} \left( \frac{L}{V_i} \right)^2 + f_1 \frac{L}{V_i} \right]$$

By definition, the frequency of the difference signal is obtained by differentiating the argument of the cosine function of equation 9 with respect to time. This yields equation 10.

$$f = K(L/V)_i \qquad (10)$$

The mixer output may be connected to a frequency spectrum analyzer so that various mode frequencies $f_i$, $i = 1, \cdots, N$ can be measured simultaneously. Thus, the velocities of all wave modes propagating between the transmitter and receiver can be measured simultaneously.

Referring now to FIG. 1 a well logging system in accordance with the concepts of the present invention is illustrated schematically. A well borehole 11 penetrates earth formations 13 and is filled with a well fluid 12. A downhole well logging sonde 14 is lowered into the borehole 11 via well logging cable 15. The well logging cable 15 passes over a sheave wheel 16 which is electrically or mechanically coupled, as indicated by a dotted line 28, to a recorder 26 which is driven as a function of the depth of the sonde 14 in the borehole 11. Thus logging measurements may be made and recorded as a function of borehole depth.

The downhole sonde 14 is provided near the lower end thereof with a transmitting acoustic transducer 17. The transducer 17 may comprise piezoelectric or magneostrictive transducer which is driven over a swept frequency range by a Swept Frequency Oscillator (SFO) 18. The transmitting transducer may be (but does not have to be) mounted on a pad which can be pressed against the wall of the borehole. The SFO also provides synchronization signals for transmission to the surface whose use will be described in more detail subsequently.

The synchronization signals (pulses) from the swept frequency oscillator 18 are provided to a telemetry transmission circuit 22 for transmission to the surface of the earth via conductors of the well logging cable 15. The output of the Swept Frequency Oscillator 18 is also supplied to a mixer circuit 19. The mixer circuit 19 preferably comprises a double balanced mixer of conventional design as known in the art. An acoustic receiving transducer 20 is coupled to the opposite input of the double balanced mixer 19. The receiving transducer 20 may comprise, for example, a piezoelectric cylinder of the type used in marine hydrophones and having an approximately flat response over the frequency region of interest. The receiver 20 acts to receive acoustic energy from the transmitter 17 which has traversed the earth formations in the interval between transmitter 17 and the receiver 20. The output of the mixer circuit 19 is supplied to a low pass, band pass filter 21, which serves to eliminate the sum frequencies as previously discussed. The difference frequencies resulting from the mixing operation of mixer 19 are then supplied to the telemetry circuit 22 for transmission to the surface of the earth via conductors of the logging cable 15.

It will be appreciated by those skilled in the art that a surface power supply 27, supplies power via conductors of the logging cable 15 to operate the downhole equipment. This is done in a conventional manner known to those skilled in the art, and hence will not be described in detail. It will suffice to say that the downhole sonde 14 is provided with power from the surface power supply 27 which is converted to suitable operating voltages by downhole converters (not shown) located in the downhole instrument 14.

At the surface, a signal detector cirucit 23 senses the arrival of synchronization pulses indicating the beginning of a sweep of frequency by the swept frequency oscillator 18. The signal detector circuit thus upon detection of a synchronization pulse conditions a spectrum analyzer 24 to receive the difference frequencies transmitted to the surface from the output of the mixer 19 in the downhole instrument. The frequency of the difference frequencies from the mixer output in the downhole instrument is then supplied to a travel time computer 25 which interprets the components of the frequency spectrum in terms of the travel time of different wave modes of acoustic energy propagated in the earth formations in the vicinity of the well borehole. The travel time computer converts the frequencies of the frequency spectrum of the mixer output from the downhole tool into travel times in accordance with Equation (10) and FIG.

2 for the different modes of acoustic energy propagating in the earth formations in the vicinity of the borehole. These travel times are supplied to the recorder 26 where they are recorded as a function of borehole depth.

Figure 3:
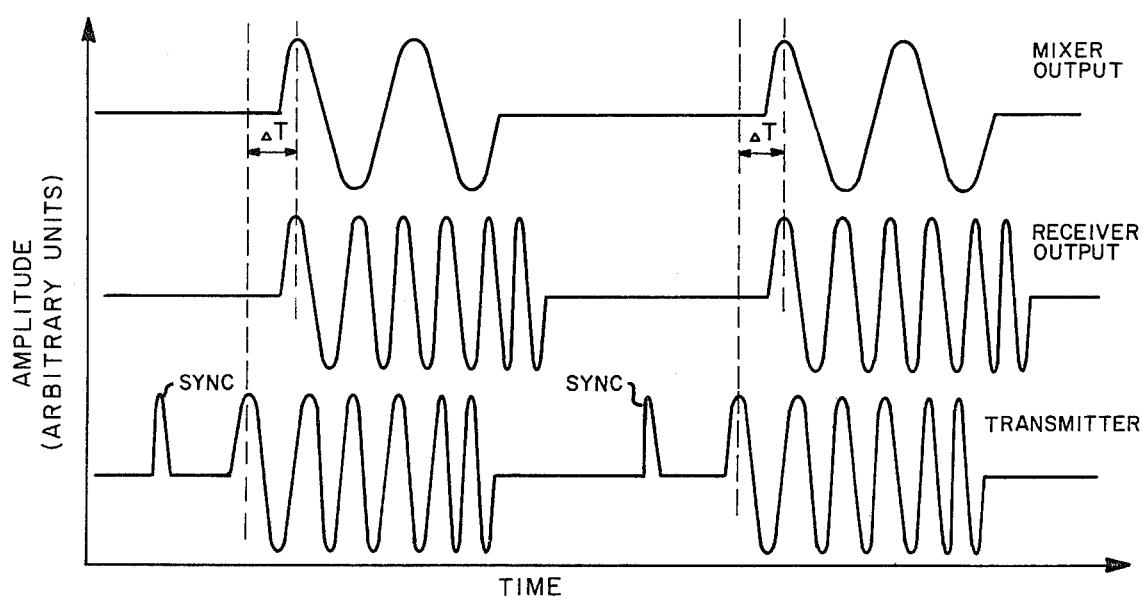
FIG. 3 is a schematic diagram illustrating the transmitter signal, the receiver signal and the mixer difference frequency output signal as a function of time for a dispersionless medium having one mode of acoustic propagation.

Referring now to FIG. 3, the output signals from the transmitting transducer, the receiving transducer and the low pass filtered output of the mixer of the downhole instrument 14 are illustrated schematically. In FIG. 3, a dispersionless medium is assumed and only one mode of propagation (compressional) is considered, for simplicity. At the beginning of a frequency sweep the swept frequency oscillator 18 supplies a synchronization signal or pulse as illustrated in FIG. 3. This allows synchronized timing and conditioning of the surface circuits. The transmitter is then excited by the Swept Frequency Oscillator 18, starting at a low frequency and being swept linearly as a function of time towards a higher frequency. After a finite interval of time $\Delta T$ which is dependent upon the transmitter and receiver spacing, the receiver begins to sense the arrival of acoustic energy from the current transmitter sweep, as illustrated in the current transmitter sweep, as illustrated in the middle drawing of FIG. 3. The waveform of the received signal corresponds to that of the transmitted signal but is phase shifted in time from the transmitted signal (in the assumed dispersionless medium) due to the propagation characteristics of the media surrounding the well borehole. Both the transmitter and receiver signals of FIG. 3 are supplied at opposite inputs to the balanced mixer 19. The output of the balanced mixer 19 is the third signal illustrated in FIG. 3. For a dispersionless medium the frequency of the mixer can be related directly to the propagation velocity of the acoustic energy between the transmitter and the receiver by Equation 10.

Figure 2:
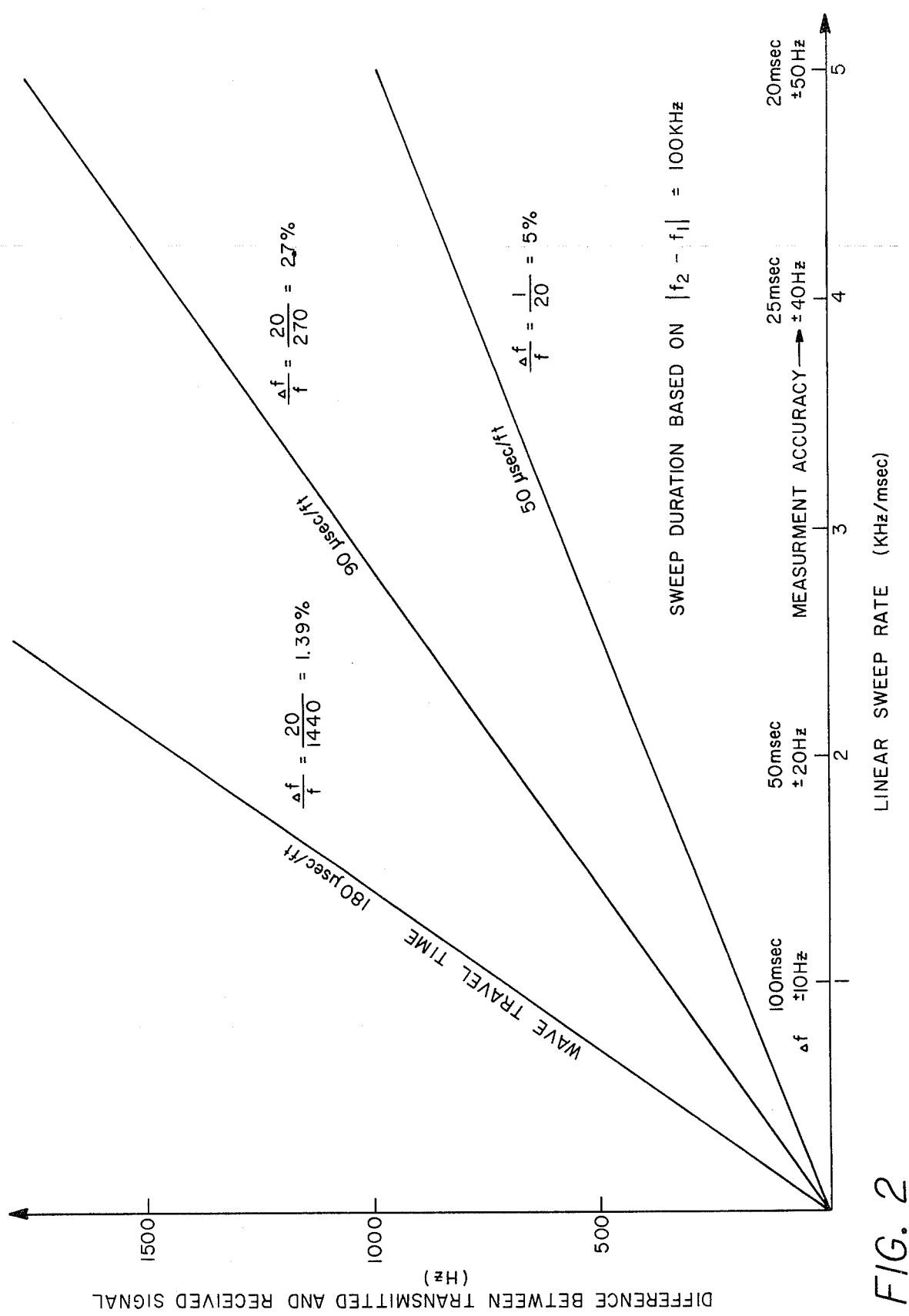
FIG. 2 is a graphical representation showing the difference frequency output of the mixer of the system of FIG. 1 for different acoustic energy propagation modes as component formation velocities and for different frequency sweep rates of the transmitter.

The relationship of mixer difference frequency to sweep rate and for multiple propagation modes may be understood more clearly by reference to FIG. 2. In FIG. 2, the mixer difference frequencies are plotted versus the oscillator sweep rate for three different mode propagation velocities, a wave propagation mode travel time of 180 microseconds per foot, a wave propagation mode travel time of 90 microseconds per foot and a wave propagation mode travel time of 50 microseconds per foot. Such velocities are typical of those for compressional, shear and Stonely waves or borehole fluid waves which are encountered in earth formations in the vicinity of a well borehole. In the cases illustrated in FIG. 2, the oscillator is set to sweep over a 100 kilohertz range of frequency at various sweep rates. At a sweep rate of 1 kilohertz per millisecond, 100 milliseconds would be required to complete the entire sweep. Similarly, at a sweep rate of 4 kilohertz per millisecond, 25 milliseconds would be required to complete the sweep. Other ranges of time per sweep would be dictated by the sweep rate required to cover the 100 kilohertz frequency of the sweep as illustrated in FIG. 2.

Consider a 2 kilohertz per millisecond frequency sweep rate. The sweep in this case will take 50 milliseconds, so that at most the mixer output signal would be present for this time period. Thus, the accuracy to which this signal can be measured would be approximately $+$ or $-20$ hertz for the case of a compressional wave having a travel time of 50 microseconds per foot, a shear wave having a travel time of 90 microseconds per foot and a Stonely wave travelling at 180 microseconds per foot. In this case of the 2 kilohertz per millisecond sweep rate the transmitter and receiver are separated by approximately 4 feet.

The mixer output would be a superposition composite wave made up of three frequency components. The frequency of the compressional wave $f_{comp}$ output from the mixer would be approximately 400 hertz. The frequency of the shear wave component $f_{shear}$ would be approximately 720 hertz and the frequency of the Stonely wave component $f_{stone}$ would be approximately 1440 hertz. These three difference frequency components are separated from the mixer output by the low pass, band pass filter in the downhole instrument and sent to the surface via the well logging cable, during the course of the sweep. At the conclusion of the sweep as indicated by the arrival of the next synchronization pulse, these three frequency components would be separated by the spectrum analyzer and supplied to the travel time computer 25. The travel time computer 25 is programmed in accordance with the graphical relationship of FIG. 2. The computer 25 could then separate the three components into their respective travel times. These component travel times are then recorded by the recorder 26 as a function of borehole depth. The entire process is reptitively performed as the tool 14 is moved through the borehole.

The foregoing technique has the advantage of using coherent detection. That is to say, the frequency of the source is swept at a linear rate. The receiver is coupled to the mixer in a linear manner such that the mixer action is virtually not responsive to incoherent noise which may randomly occur in the borehole. In this manner, low level signals may be utilized for the purpose of establishing the acoustic travel time of the various modes of acoustic waves. Incoherent noise generated by tool movement will be averaged out over the sweep period. Logic in the travel time computer 25 may be utilized to distinguish predominant amplitude frequency components in the frequency spectrum of the mixer output. In this manner, a high signal/noise ratio may be obtained in the presence of a relatively high random noise level in the borehole.

It will be appreciated by those skilled in the art that while the acoustic transmitting and receiving transducer have been illustrated as being carried in the body of a well logging sonde and acoustically coupled to the borehole fluid, that these transducers could if desired, be placed on pad arms and urged against the borehole wall. Similarly, a backup arm could urge the entire sonde against one wall of the borehole for obtaining the travel time measurements, if desired.

Other changes and modifications of the basic concepts of the present invention may be made apparent by the foregoing disclosure to those skilled in the art. It is therefore, the aim of the appended claims to cover all such changes and modifications as fall within the true spirit and scope of the invention.

I claim:

1. A method for measuring the speed of multiple acoustic energy wave propagation modes in earth formations in the vicinity of a well borehole, comprising the steps of:

generating, in a well borehole, discrete burst acoustic energy signals having a plurality of wave propagation modes, said signals having a consistently linearly changing frequency as a function of time and a synchronization associated therewith;

detecting, at a longitudinally spaced distance from the location of generation in a well borehole, acoustic energy wave modes propagated in the borehole and earth formations in the vicinity of the borehole, and generating signals representative thereof;

generating product signals as a function of time representative of the products of said linearly changing frequency generated signals and said detected signals;

forming frequency spectra of said product signals;

deriving from said frequency spectra of said product signals, indications of the speed of propagation of a plurality of modes of acoustic wave energy and generating mode propagation speed signals indicative thereof; and recording said mode propagation speed signals and said frequency spectra as a function of borehole depth.

2. The method of claim 1 wherein the steps are performed repetitively as a logging instrument containing means for performing said generating and detecting steps is moved through a well borehole.

3. A method for measuring the speed of propagation of multiple acoustic energy wave propagation modes in earth formations in the vicinity of a well borehole, comprising the steps of:

transmitting, at a first location in a well borehole, discrete bursts of acoustic wave energy having a time varying frequency swept at a consistently linear rate over a predetermined frequency range and generating electrical signals representative of said transmitted swept frequency acoustic wave energy and a synchronization signal associated with said discrete bursts;

receiving, at a second longitudinally spaced location in a well borehole, acoustic energy resulting from said transmitting step and generating electrical signals representative of said received acoustic energy;

generating a product electrical signal representative of the product of said transmitted swept frequency electrical signal and said received electrical signal; whereby the frequency content of said product signal is representative of the speed of propagation of multiple acoustic wave energy modes in the vicinity of said first and second locations in a well borehole;

generating, from said product electrical signal, a frequency versus amplitude spectrum of said product electrical signal; and determining, from said frequency versus amplitude spectrum, the speed of propagation of multiple acoustic wave energy modes in earth formations in the vicinity of the well borehole.

4. The method of claim 3 and further including the step of low pass filtering said product signal to eliminate any frequency content thereof greater than the lowest frequency of said transmitted swept frequency acoustic wave energy.

5. The method of claim 4 and further including the step, subsequently to low pass filtering, of deriving a power versus frequency spectrum of said low pass filtered signal.

6. The method of claim 5 and further including the step of relating frequency components of said power versus frequency spectrum to the wave mode propagation velocity of multiple acoustic energy modes in the vicinity of said first and second locations in a well borehole.

7. The method of claim 6 wherein the steps are performed repetitively at different depth levels in a well borehole.

8. A system for measuring the speed of propagation of multiple acoustic energy wave propagation modes in earth formations in the vicinity of a well borehole comprising;

a fluid tight hollow body member sized and adapted for passage through a well borehole and housing therein;

means, located at a first location therein, for transmitting discrete bursts of acoustic wave energy having a time varying frequency swept at a consistently linear rate over a predetermined frequency range and for generating electrical signals representative of said transmitted swept frequency acoustic wave energy and synchronization signals associated therewith;

means, located at a second, longitudinally spaced location therein, for receiving acoustic energy resulting from activation of said transmitting means, and for generating electrical signals representative of said received acoustic energy;

means for generating a product electrical signal representative of the product of said transmitted swept frequency electrical signal and said received energy representative electrical signal, whereby components of the frequency content of said product signal is representative of the speed of propagation of multiple acoustic wave energy modes in the vicinity of said body member;

means for deriving a frequency versus amplitude spectrum of said product signal; and means for determining from said frequency versus amplitude spectrum, the speed of propagation of multiple acoustic energy modes in materials in the vicinity of said body member.

9. The system of claim 8 and further including low pass filter means for filtering said product signal to eliminate any frequency content thereof greater than the lowest frequency of said transmitted swept frequency acoustic wave energy.

10. The system of claim 9 and further including:

means for deriving a power vs. frequency spectrum of said low pass filtered product signal.

11. The system of claim 10 and further including computer means for relating frequency components of said power vs. frequency spectrum to the wave mode propagation velocity of acoustic energy modes in materials in the vicinity of said body member.

12. The system of claim 11 and further including control means for controlling the system to perform transmitting, receiving, filtering and deriving power spectra repetitively as said body member is moved through a well borehole.

\* \* \* \* \*